US011791678B2

(12) United States Patent
Hsieh et al.

(10) Patent No.: US 11,791,678 B2
(45) Date of Patent: Oct. 17, 2023

(54) MOTOR AND ROTOR STRUCTURE THEREOF

(71) Applicant: NATIONAL CHENG KUNG UNIVERSITY, Tainan (TW)

(72) Inventors: Min-Fu Hsieh, Tainan (TW); Mi-Ching Tsai, Tainan (TW); Kai-Jung Shih, Tainan (TW); Lucio Jose Fernando Caceres Vera, Tainan (TW); Guan-Ming Chen, Kaohsiung (TW)

(73) Assignee: National Cheng Kung University, Tainan (TW)

( * ) Notice: Subject to any disclaimer, the term of this patent is extended or adjusted under 35 U.S.C. 154(b) by 115 days.

(21) Appl. No.: 17/184,851

(22) Filed: Feb. 25, 2021

(65) Prior Publication Data
US 2022/0271581 A1  Aug. 25, 2022

(51) Int. Cl.
*H02K 1/27* (2022.01)
*H02K 21/14* (2006.01)
*H02K 1/276* (2022.01)

(52) U.S. Cl.
CPC ............. *H02K 1/276* (2013.01); *H02K 21/14* (2013.01)

(58) Field of Classification Search
CPC .............................. H02K 1/276; H02K 21/14
USPC ................................................... 310/156.56
See application file for complete search history.

(56) References Cited

U.S. PATENT DOCUMENTS

| 7,843,100 B2 * | 11/2010 | Blissenbach | H02K 1/2766 310/156.43 |
| 8,890,385 B2 * | 11/2014 | Sano | H02K 1/2766 310/156.53 |
| 8,957,561 B2 * | 2/2015 | Sano | H02K 1/2766 310/156.56 |
| 9,231,445 B2 * | 1/2016 | Sano | H02K 1/2766 |
| 9,515,525 B2 * | 12/2016 | Shibata | H02K 21/14 |
| 9,755,462 B2 * | 9/2017 | Jurkovic | H02K 1/2766 |
| 9,941,775 B2 * | 4/2018 | Fiseni | H02K 1/28 |
| 10,530,205 B2 * | 1/2020 | Hattori | H02K 1/2766 |
| 2005/0140236 A1 * | 6/2005 | Jeong | H02K 1/2766 310/156.53 |

(Continued)

FOREIGN PATENT DOCUMENTS

| CN | 105794087 A | 7/2016 |
| CN | 111555490 A | 8/2020 |

*Primary Examiner* — Alex W Mok
(74) *Attorney, Agent, or Firm* — Rosenberg, Klein & Lee

(57) ABSTRACT

A motor and a rotor structure thereof are disclosed. The rotor structure includes a rotor core. The rotor core has a plurality of magnetic member units arranged around a periphery of the rotor core. Each magnetic member unit includes two first magnetic members and a second magnetic member. The two first magnetic members are obliquely arranged in a V shape relative to a center of the rotor core. The second magnetic member extends transversely between the two first magnetic members. Each first magnetic member has at least two permanent magnets that are arranged obliquely. The motor further includes a stator core covering the rotor core. The stator core has a plurality of stator windings arranged annularly. The stator windings correspond to the magnetic member units. The rotor structure has high structural strength, and the phenomenon of stress concentration is less obvious when the motor is running.

8 Claims, 16 Drawing Sheets

(56) References Cited

U.S. PATENT DOCUMENTS

| | | | |
|---|---|---|---|
| 2010/0141076 A1* | 6/2010 | Blissenbach | H02K 1/2766 |
| | | | 29/598 |
| 2012/0200187 A1* | 8/2012 | Sano | H02K 1/2766 |
| | | | 310/156.07 |
| 2012/0200188 A1* | 8/2012 | Sano | H02K 1/2766 |
| | | | 310/216.106 |
| 2018/0034332 A1* | 2/2018 | Takahashi | H02K 1/243 |
| 2018/0145552 A1* | 5/2018 | Hattori | H02K 1/2766 |
| 2019/0296594 A1* | 9/2019 | Nashiki | H02K 1/27 |

\* cited by examiner

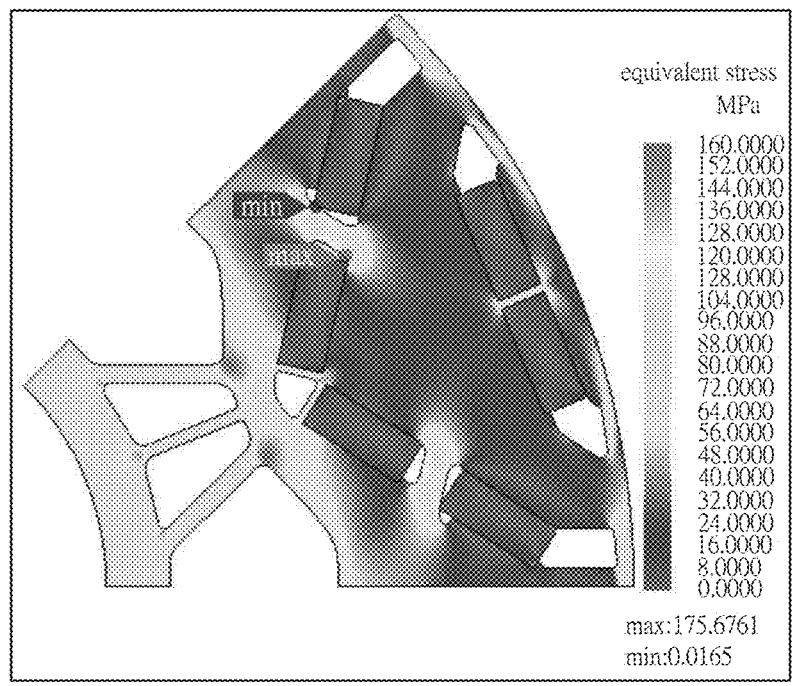
F I G . 6B

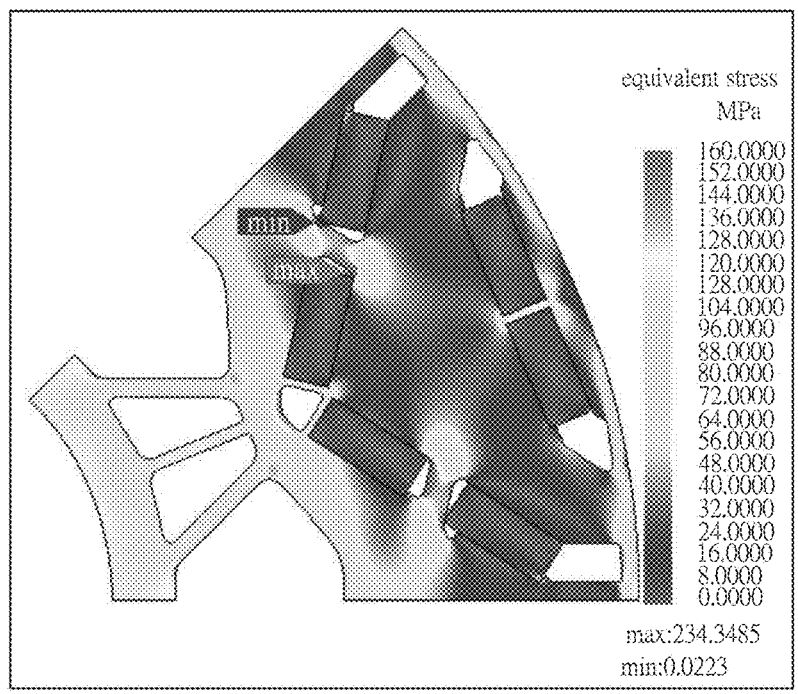
F I G . 7B

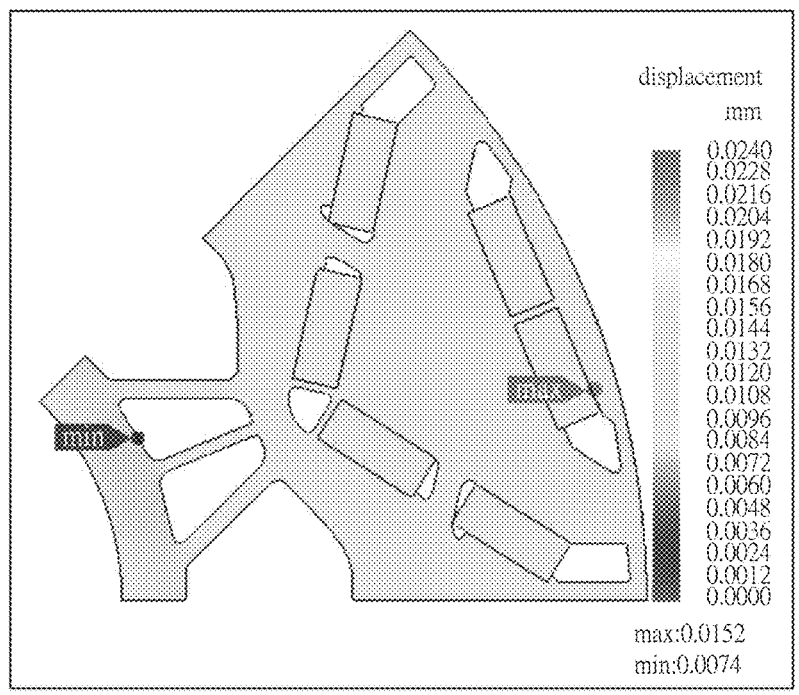
F I G . 8B

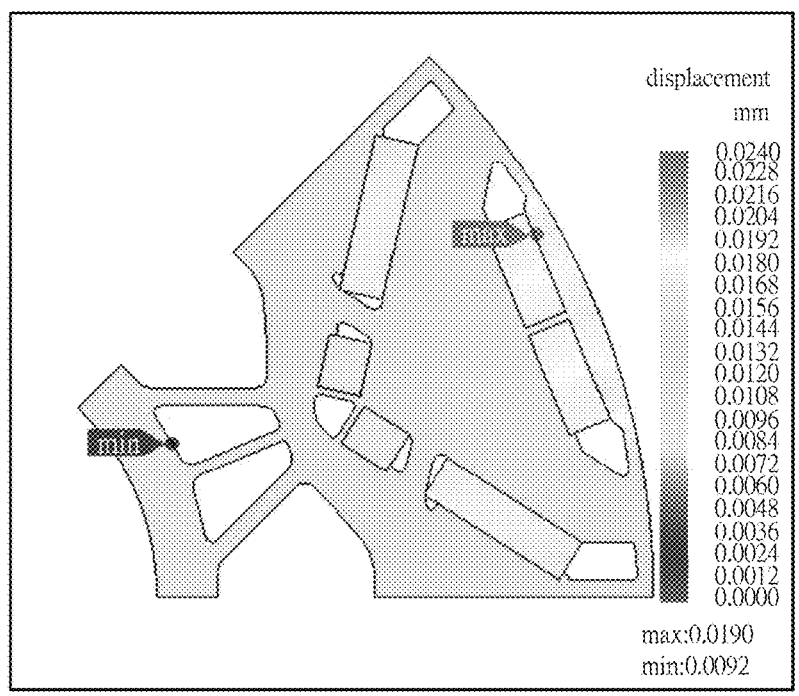
F I G . 9C
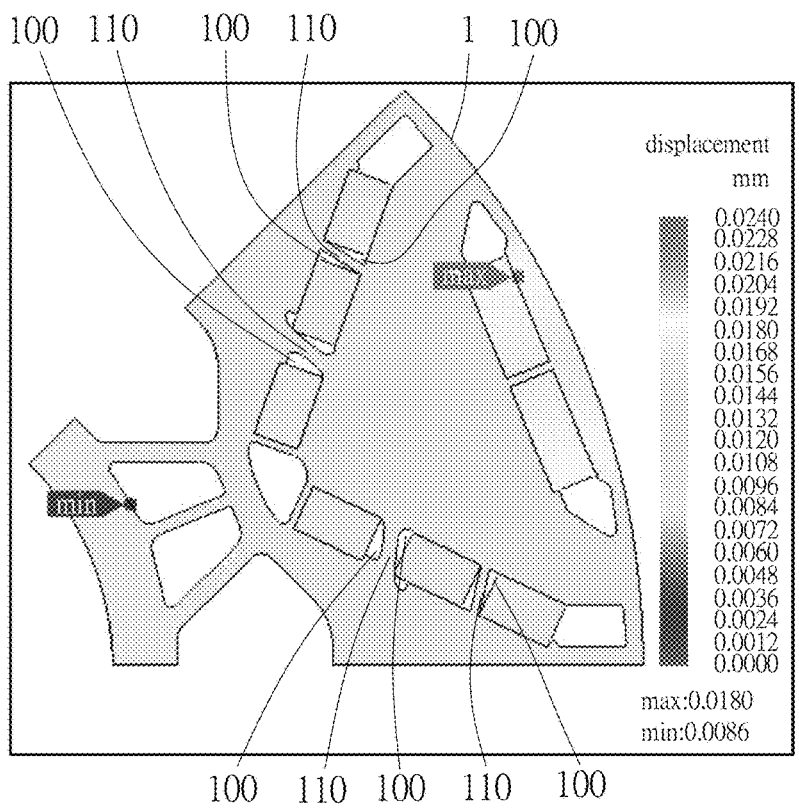
F I G . 9D

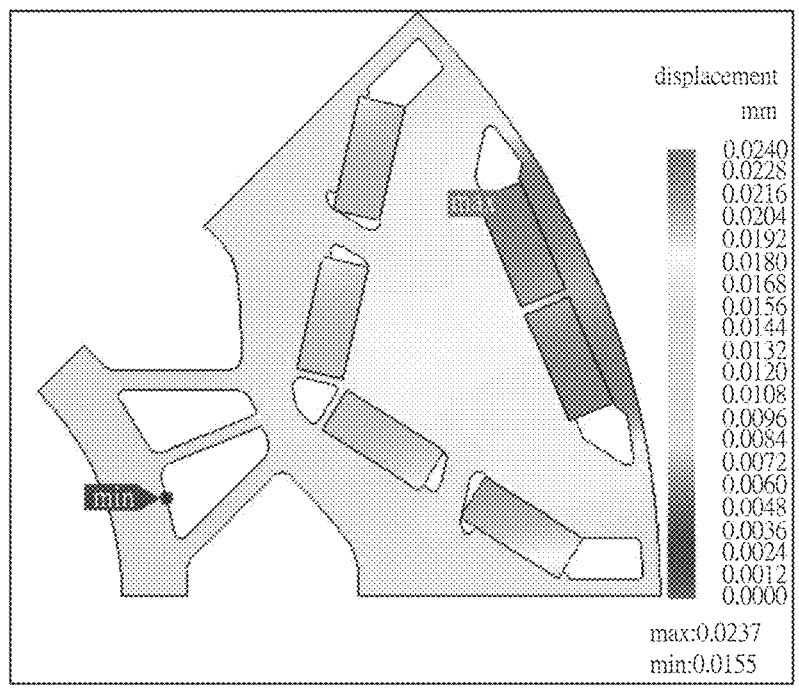
F I G . 10B

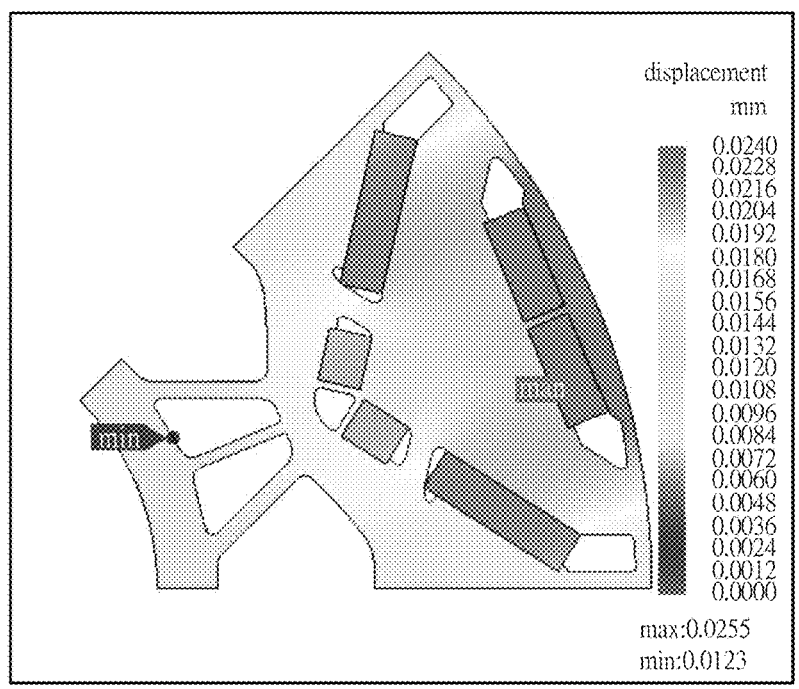
F I G . 10C
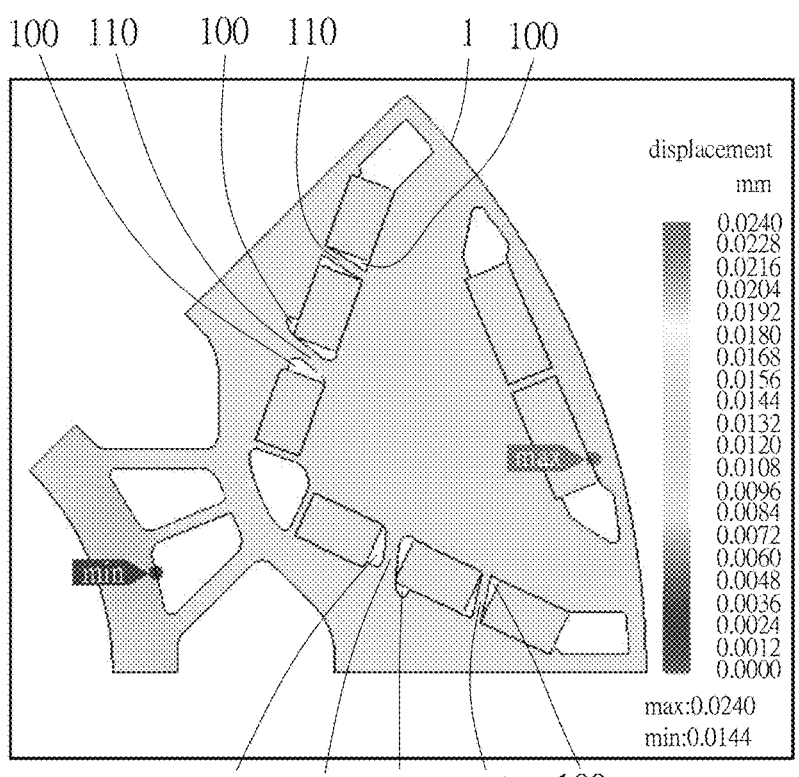
F I G . 10D

MOTOR AND ROTOR STRUCTURE THEREOF

FIELD OF THE INVENTION

The present invention relates to a motor and a rotor structure thereof, and more particularly to a rotor structure with high strength, which can withstand higher speeds when the motor is running.

BACKGROUND OF THE INVENTION

Referring to FIG. 4, a conventional motor for an electric vehicle (the motor is used for Lexus LS600h) comprises a rotor A and a corresponding stator B. The rotor A has a plurality of magnetic member units A1 arranged annularly. The stator B has a plurality of stator windings B1 corresponding to the magnetic member units A1. Each magnetic member unit A1 includes two first magnetic members A11 and a second magnetic member A12. The two first magnetic members A11 are obliquely arranged in a V shape relative to the center of the rotor A. The second magnetic member A12 extends transversely between the two first magnetic members A11. Each of the first magnetic members A11 and the second magnetic member A12 is an elongated permanent magnet.

Referring to FIGS. 5-7, when the above-mentioned motor is running, the rotor A appears the phenomenon of stress concentration, and when the rotational speed reaches 13000 rpm, the safety factor of its operation has dropped below 1. Referring to FIGS. 8-10, the amount of deformation and displacement of the rotor A and the magnetic member unit A1 is relatively large when the above-mentioned motor is running. Therefore, the structural strength of the above-mentioned motor structure is limited, and the rotational speed cannot be further increased.

SUMMARY OF THE INVENTION

In order to improve the structural strength of a rotor for a motor to withstand higher speeds, the present invention provides a rotor structure that is different from the conventional motor, comprising a rotor core. The rotor core has a plurality of magnetic member units arranged around a periphery of the rotor core. Each magnetic member unit includes two first magnetic members and a second magnetic member. The two first magnetic members are obliquely arranged in a V shape relative to a center of the rotor core. The second magnetic member extends transversely between the two first magnetic members. Each first magnetic member has at least two permanent magnets that are arranged obliquely.

Preferably, the second magnetic member has at least two permanent magnets that are arranged transversely.

Preferably, the permanent magnets of each first magnetic member are of equal length.

Preferably, the permanent magnets of each first magnetic member are of unequal length.

The present invention further provides a motor, comprising a rotor core and a stator core. The rotor core has a plurality of magnetic member units arranged around a periphery of the rotor core. Each magnetic member unit includes two first magnetic members and a second magnetic member. The two first magnetic members are obliquely arranged in a V shape relative to a center of the rotor core. The second magnetic member extends transversely between the two first magnetic members. Each first magnetic member has at least two permanent magnets that are arranged obliquely. The stator core covers the rotor core. The stator core has a plurality of stator windings arranged annularly. The stator windings correspond to the magnetic member units.

According to the above technical features, the following effects can be achieved:

The rotor structure of the present invention has a higher structural strength when using the same amount of magnetic materials as the above-mentioned conventional motor used. When the motor is running, the rotor structure appears less stress concentration. In addition, when the motor is running, the amount of deformation and displacement of the rotor core and the magnetic member unit is small.

BRIEF DESCRIPTION OF THE DRAWINGS

FIGS. 6A-6D are schematic views, illustrating the stress distribution of the motor of the present invention and the conventional motor under the rotational speed of 13000 rpm;

FIGS. 7A-7D are schematic views, illustrating the stress distribution of the motor of the present invention and the conventional motor under the rotational speed of 15000 rpm;

FIGS. 8A-8D are schematic views, illustrating the deformation and displacement of the rotor core and the magnetic member unit of the motor of the present invention and the conventional motor under the rotational speed of 12000 rpm;

FIGS. 9A-9D are schematic views, illustrating the deformation and displacement of the rotor core and the magnetic member unit of the motor of the present invention and the conventional motor under the rotational speed of 13000 rpm; and FIGS. 10A-10D are schematic views, illustrating the deformation and displacement of the rotor core and the magnetic member unit of the motor of the present invention and the conventional motor under the rotational speed of 15000 rpm.

DESCRIPTION OF THE PREFERRED EMBODIMENTS

Embodiments of the present invention will now be described, by way of example only, with reference to the accompanying drawings.

Figure 1:
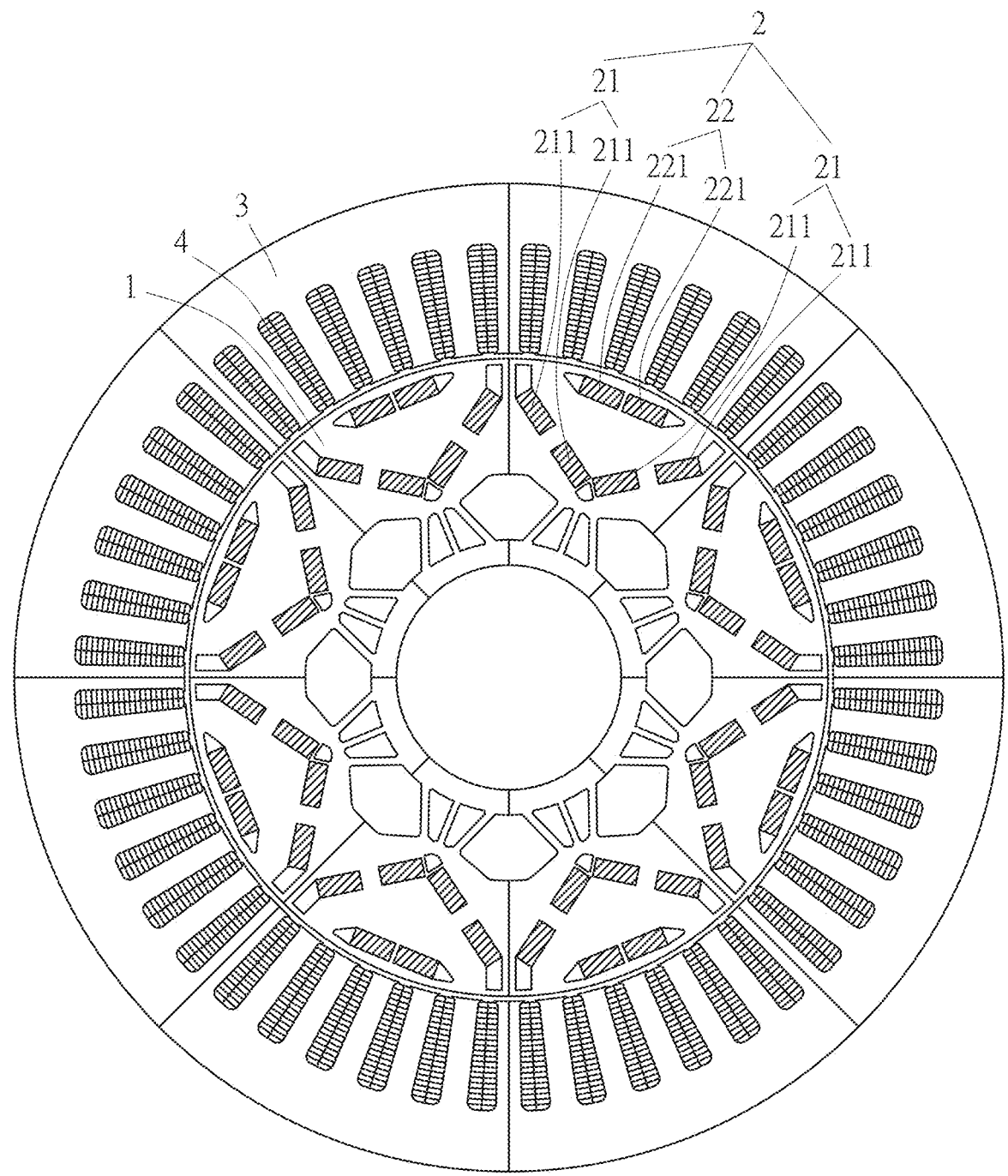
FIG. 1 is a schematic view of the motor of the present invention, wherein each first magnetic member has two permanent magnets of equal length.

As shown in FIG. 1, a rotor structure for a motor according to an embodiment of the present invention comprises a rotor core 1. The rotor core 1 has a plurality of magnetic member units 2 arranged around the periphery of the rotor core 1. The motor of this embodiment further includes a stator core 3. The stator core 3 covers the rotor core 1. The stator core 3 has a plurality of stator windings 4 arranged annularly. The stator windings 4 correspond to the magnetic member units 2.

Each magnetic member unit 2 of the rotor core 1 includes two first magnetic members 21 and a second magnetic member 22. The two first magnetic members 21 are obliquely arranged in a V shape relative to the center of the rotor core 1. The second magnetic member 22 extends transversely between the two first magnetic members 21. As shown in FIG. 1, each first magnetic member 21 has two permanent magnets 211 that are arranged obliquely and are of equal length. The second magnetic member 22 has two permanent magnets 221 that are arranged transversely.

Figure 2:
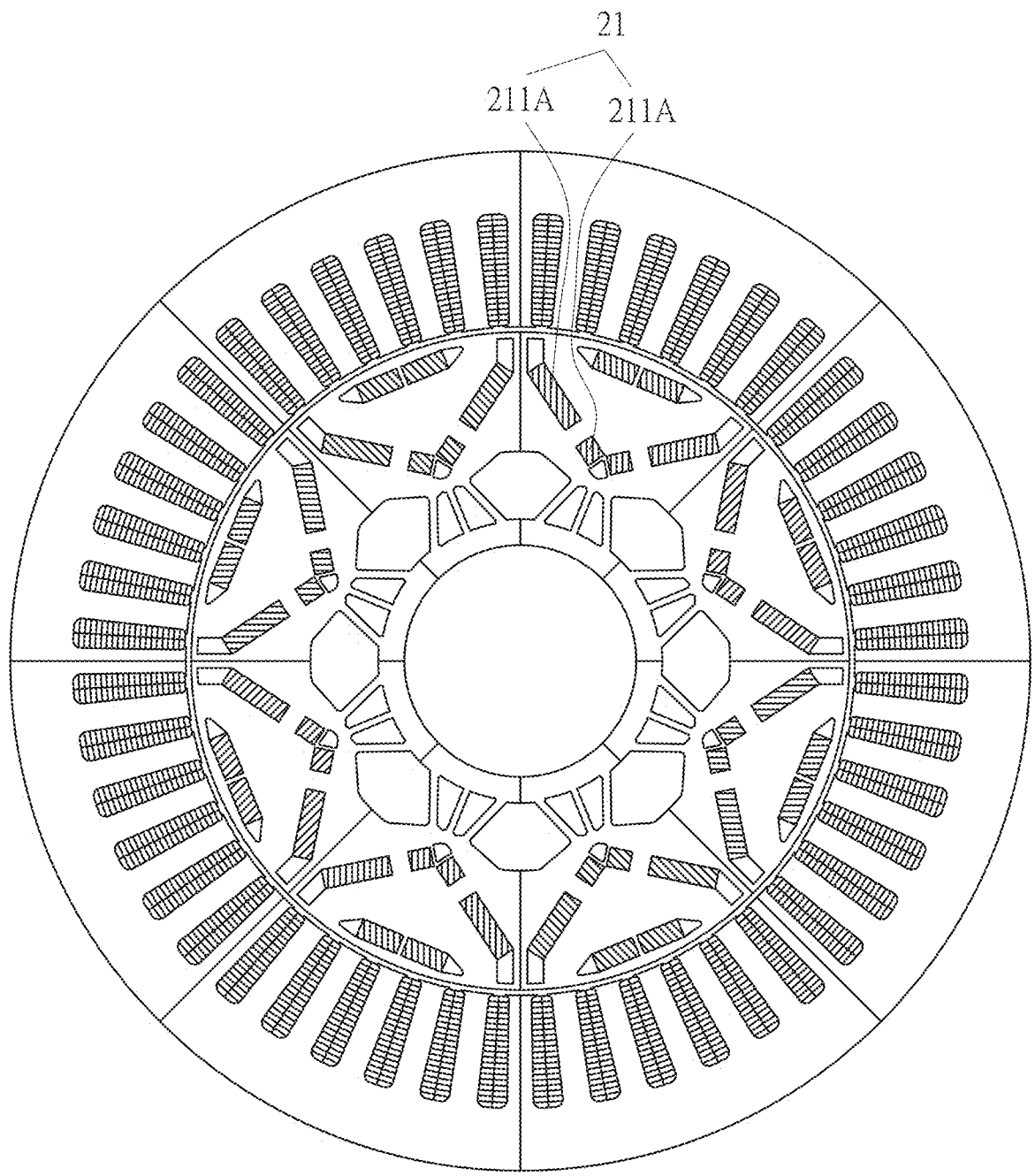
FIG. 2 is a schematic view of the motor of the present invention, wherein each first magnetic member has two permanent magnets of unequal length.

As shown in FIG. 2, in this embodiment, each first magnetic member 21 has two permanent magnets 211A that are arranged obliquely and are of unequal length.

Figure 3:
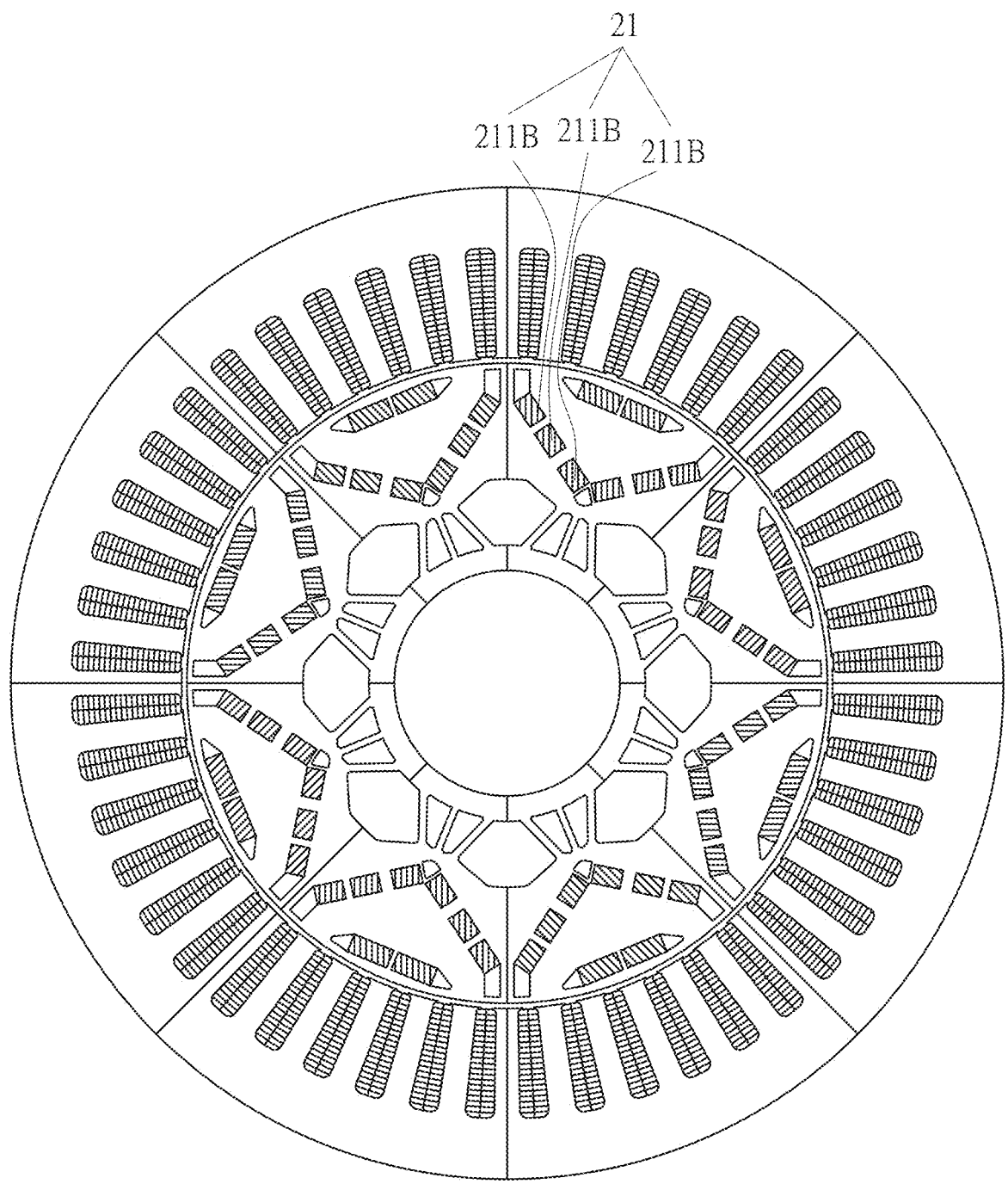
FIG. 3 is a schematic view of the motor of the present invention, wherein each first magnetic member has three permanent magnets of equal length.

As shown in FIG. 3, in this embodiment, each first magnetic member 21 has three permanent magnets 211B that are arranged obliquely and are of equal length.

As depicted in FIGS. 5D, 6D, 7D, 8D, 9D and 10D, the rotor core 1 is configured with a plurality of receiving notches 100 separated by respective ribs 110. Each rib 110 is disposed between respective adjacent receiving notches 100, so that adjacent permanent magnets 211, as well as 211A and 211 B (also shown in FIGS. 1, 2 and 3, respectively) are received in adjacent respective receiving notches 100 spaced apart from one another by a respective rib 110.

Figure 6A:
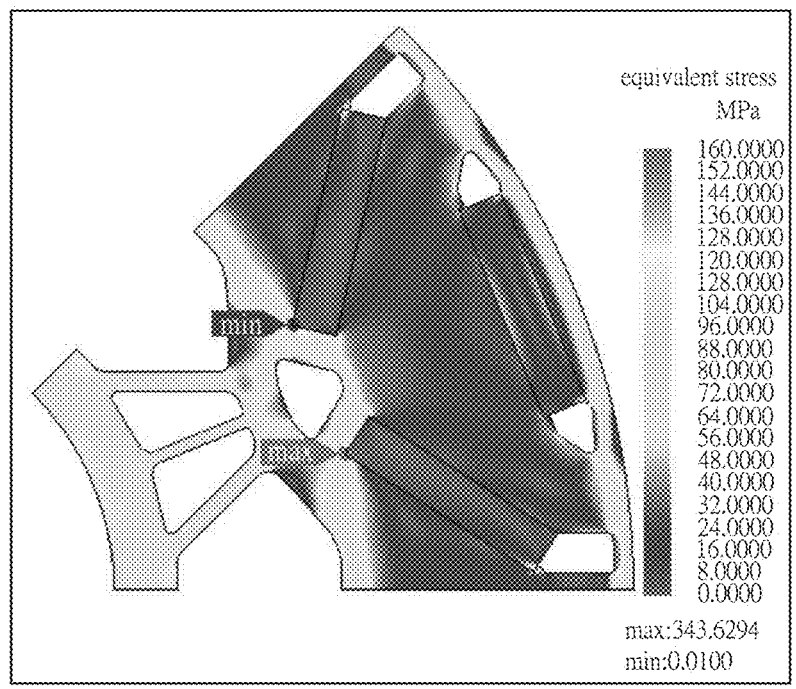
Figure 6C:
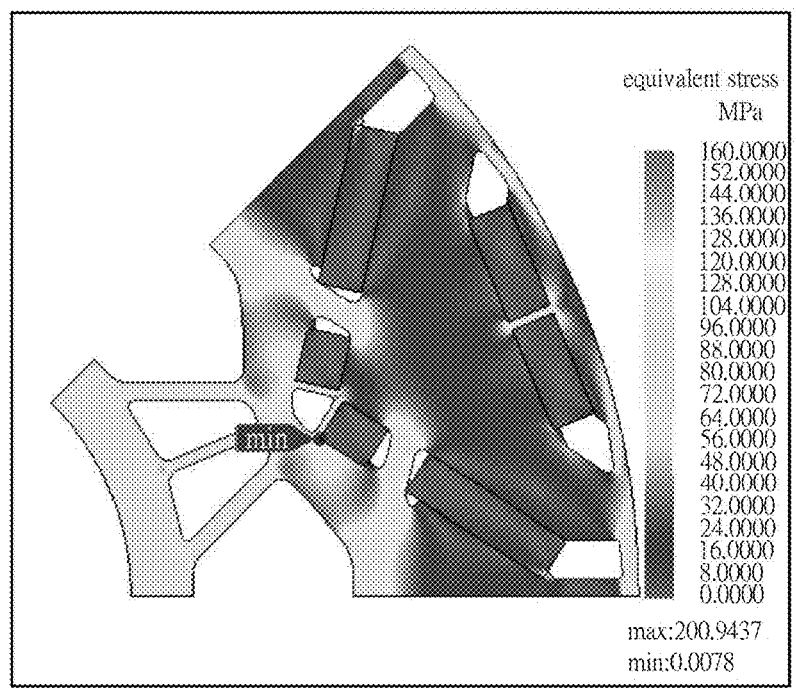
Figure 6D:
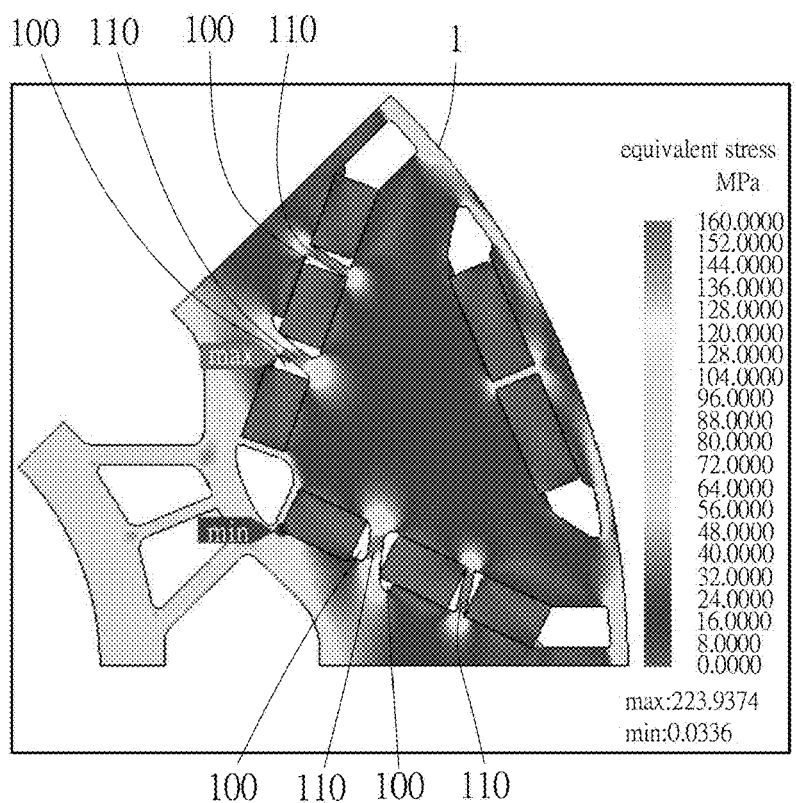
Figure 7A:
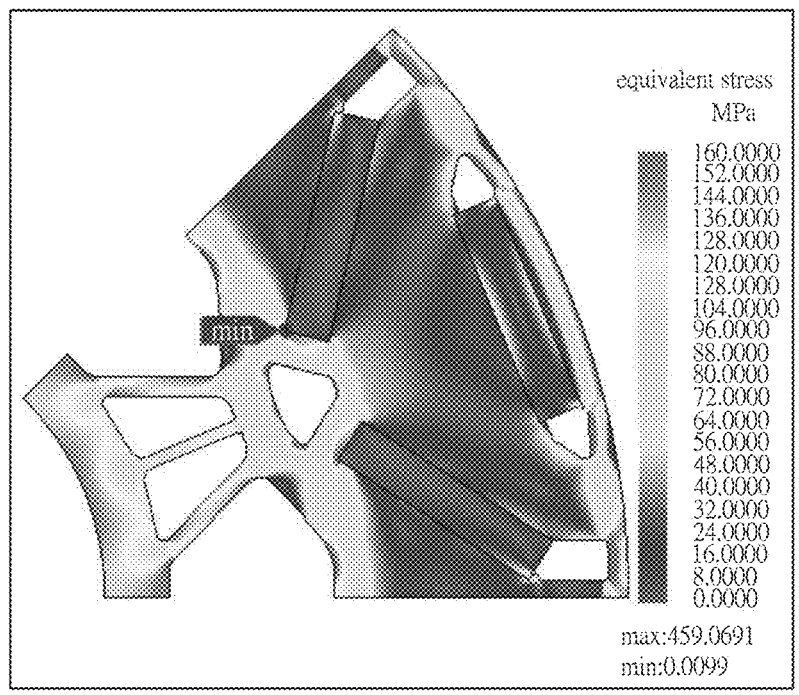
Figure 7C:
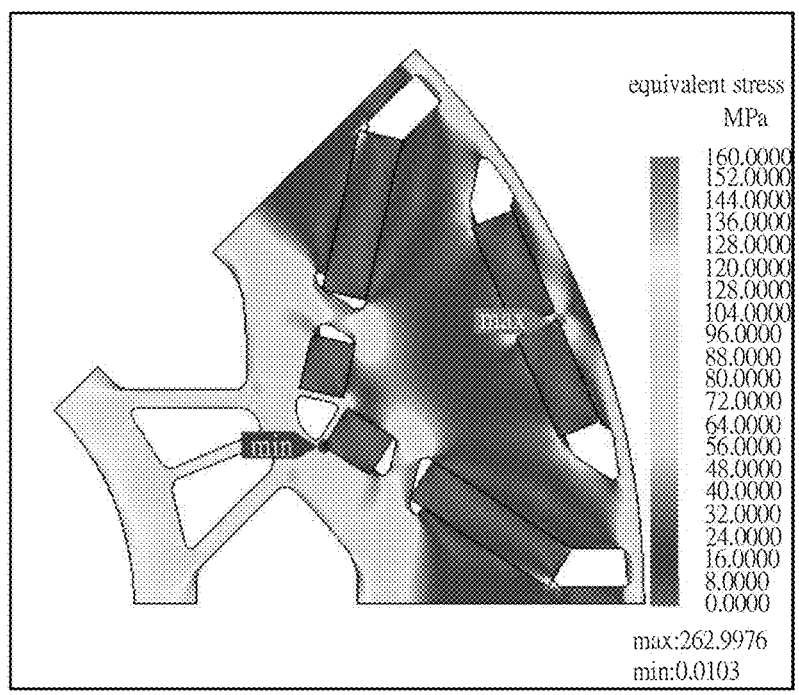
Figure 7D:
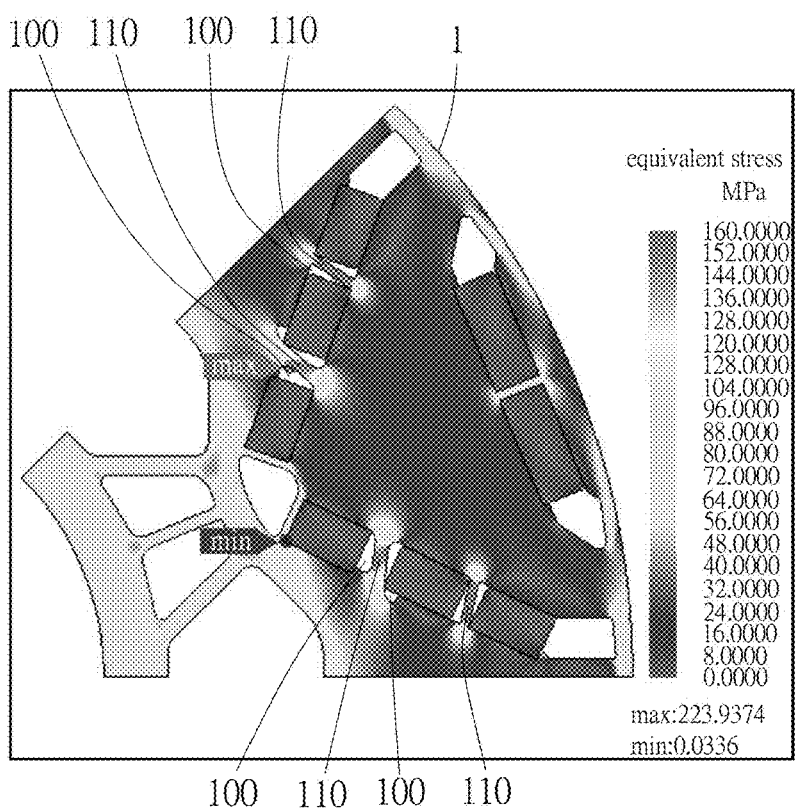

FIGS. 5-7 are schematic views illustrating the simulation of the stress distribution of the motor of this embodiment and the above-mentioned conventional motor respectively under the rotational speed of 12000 rpm, 13000 rpm and 15000 rpm. The maximum stress value of the conventional motor at the rotational speed of 12000 rpm is about 293 MPa. Its safety factor is 330/293, which is about 1.12. The maximum stress value of the motor of this embodiment at the rotational speed of 12000 rpm is about 158 MPa, 167 Mpa and 192 Mpa, respectively, and its safety factor is about 2.086, 1.976 and 2.088. The maximum stress value of the conventional motor at the rotational speed of 13000 rpm is about 343 MPa. Its safety factor is 330/343, which is about 0.96. The maximum stress value of the motor of this embodiment at the rotational speed of 13000 rpm is about 175 MPa, 200 Mpa and 223 Mpa, respectively, and its safety factor is about 1.87, 1.64 and 1.47. The maximum stress value of the conventional motor at the rotational speed of 15000 rpm is about 459 MPa. Its safety factor is 330/459, which is about 0.718. The maximum stress value of the motor of this embodiment at the rotational speed of 15000 rpm is about 234 MPa, 262 Mpa and 223 Mpa, respectively, and its safety factor is about 1.408, 1.25 and 1.41. It can be seen from the above values that the safety factor of the motor of the present invention is much greater than that of the conventional motor. The safety factor of the conventional motor is less than 1 when the rotational speed is 13000 rpm. The safety factor of the motor of this embodiment is still greater than 1 when the rotational speed is 15000 rpm.

Figure 8A:
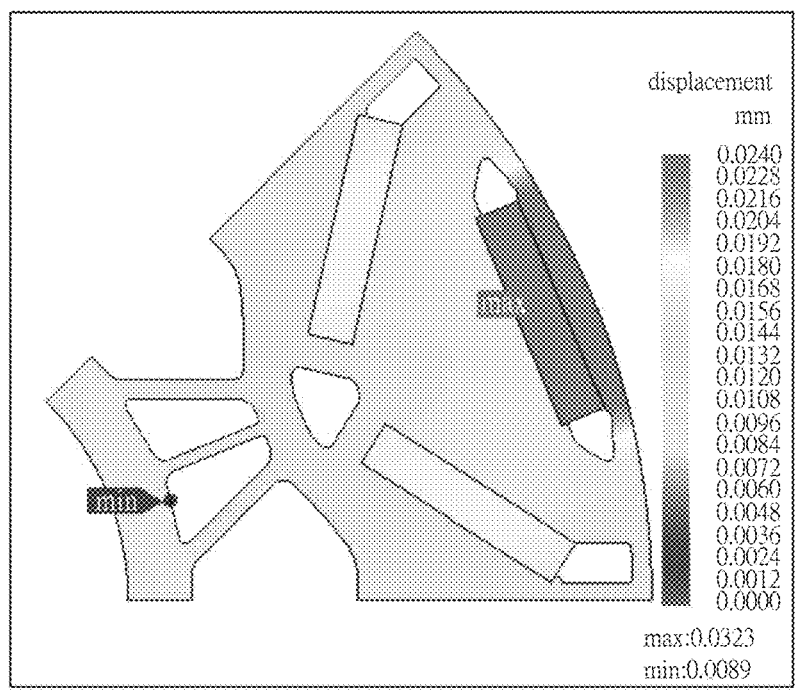
Figure 8C:
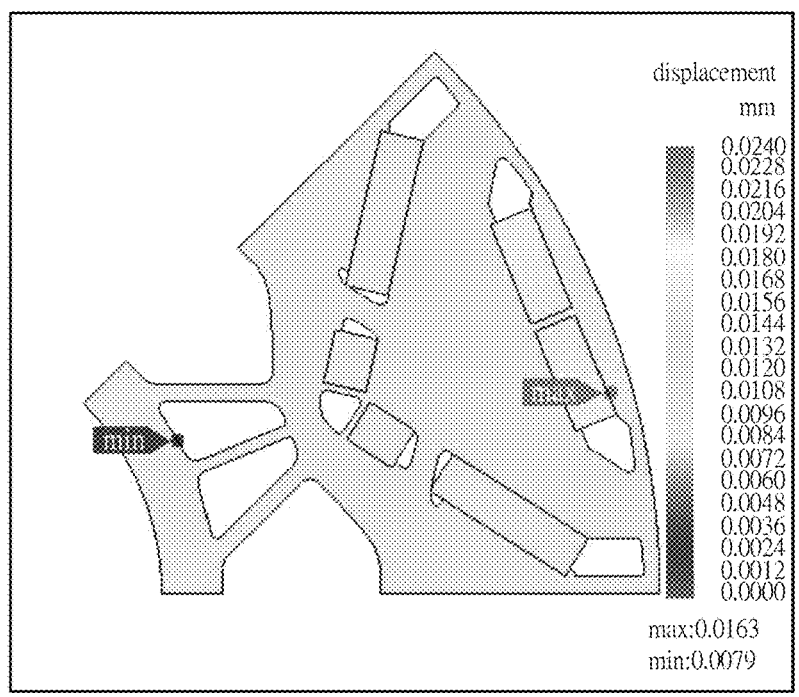
Figure 8D:
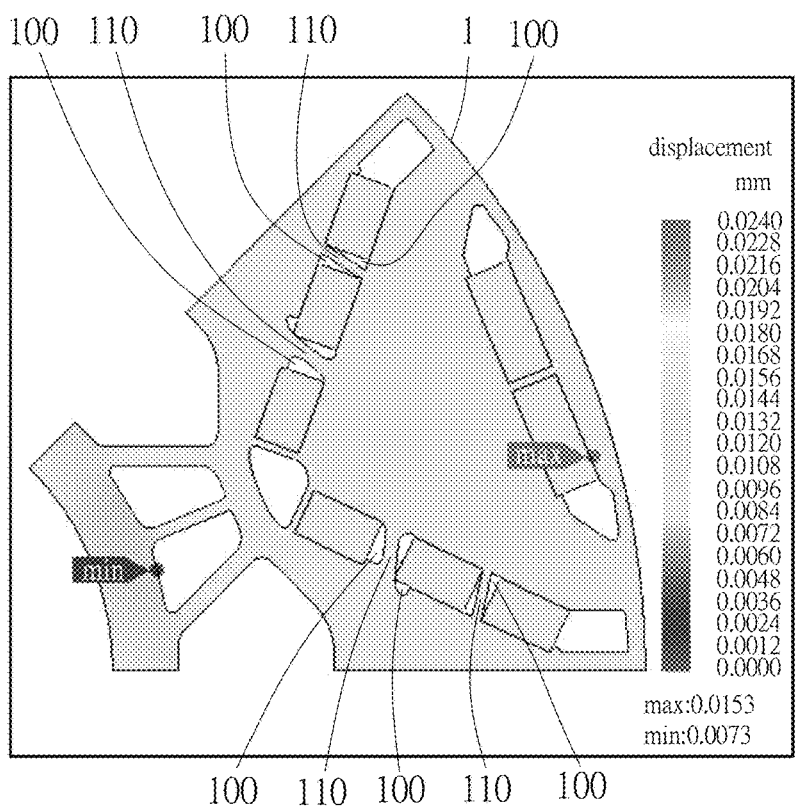
Figure 9A:
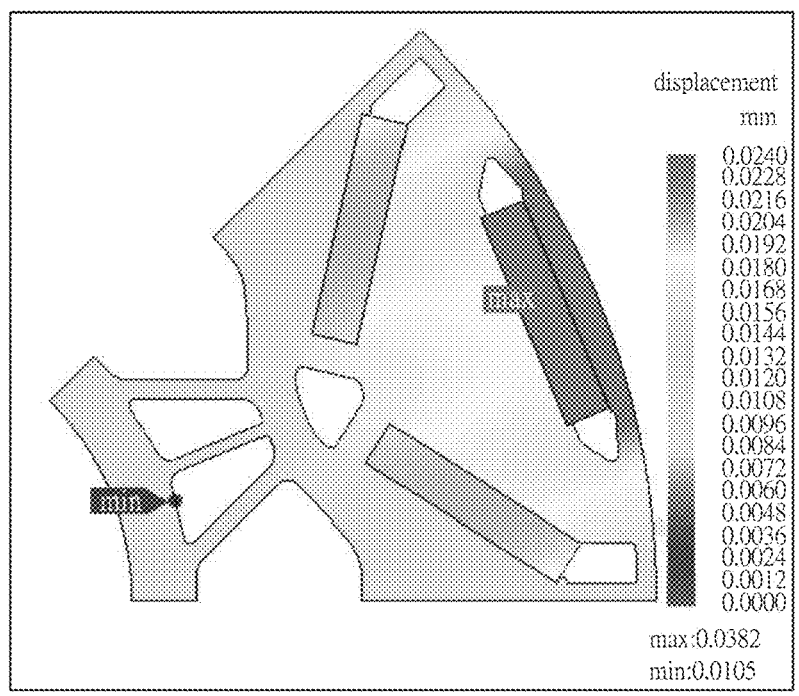
Figure 9B:
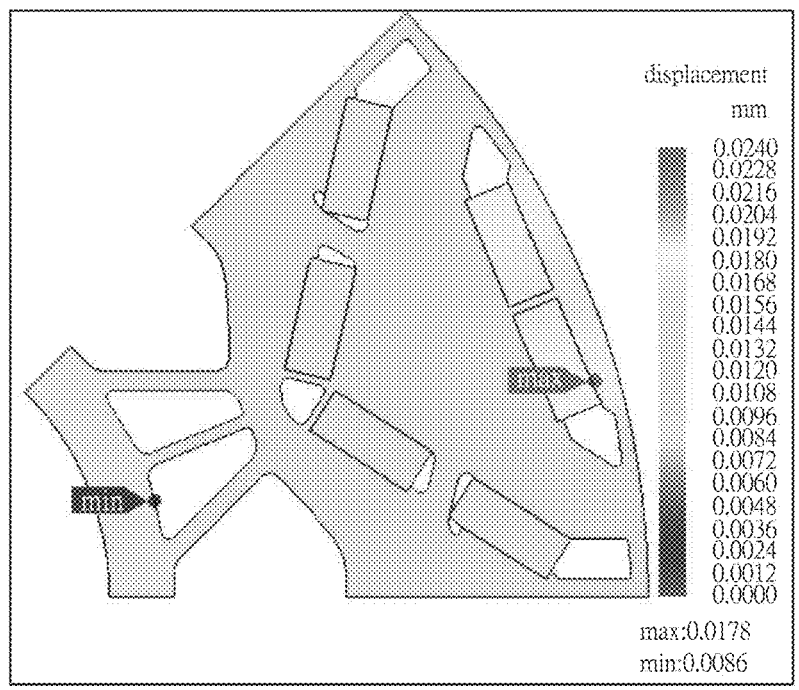
Figure 10A:
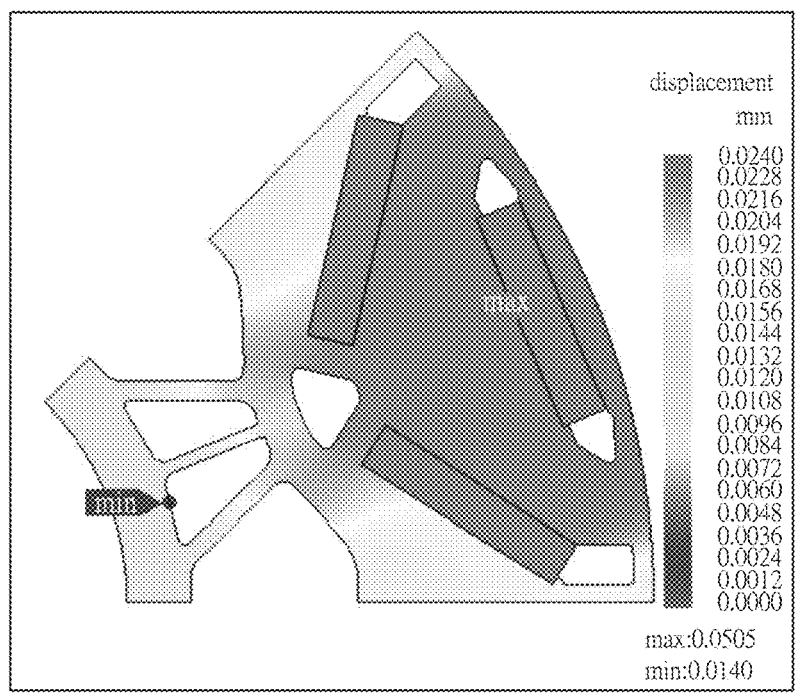

FIGS. 8-10 are schematic views illustrating the simulation of the deformation and displacement of the rotor core 1 and the magnetic member unit 2 of the motor of this embodiment and the above-mentioned conventional motor respectively under the rotational speed of 12000 rpm, 13000 rpm and 15000 rpm. It can be seen from the above views that, at the same rotational speed, the deformation and displacement of the rotor A and the magnetic member unit A1 of the conventional motor is more than twice the deformation and displacement of the rotor core 1 and the magnetic member unit 2 of the motor of this embodiment.

It can be seen from the foregoing experimental simulations that when the motor of the present invention is running, the rotor structure 1 has less stress concentration. In addition, when the motor is running, the amount of deformation and displacement of the rotor core 1 and the magnetic member unit 2 is small. Therefore, the rotor structure 1 of the present invention has a higher structural strength and can withstand a higher motor speed.

Please refer to the following table that compares the torque, maximum power, magnet temperature and other parameters of the motor of this embodiment and the conventional motor at different speeds. It can be seen from the table that the magnetic member unit 2 on the rotor core 1 of the motor of the present invention has different configurations, and thus can have a higher structural strength, but will not affect its torque, maximum power, magnet temperature and so on.

Figure 4:
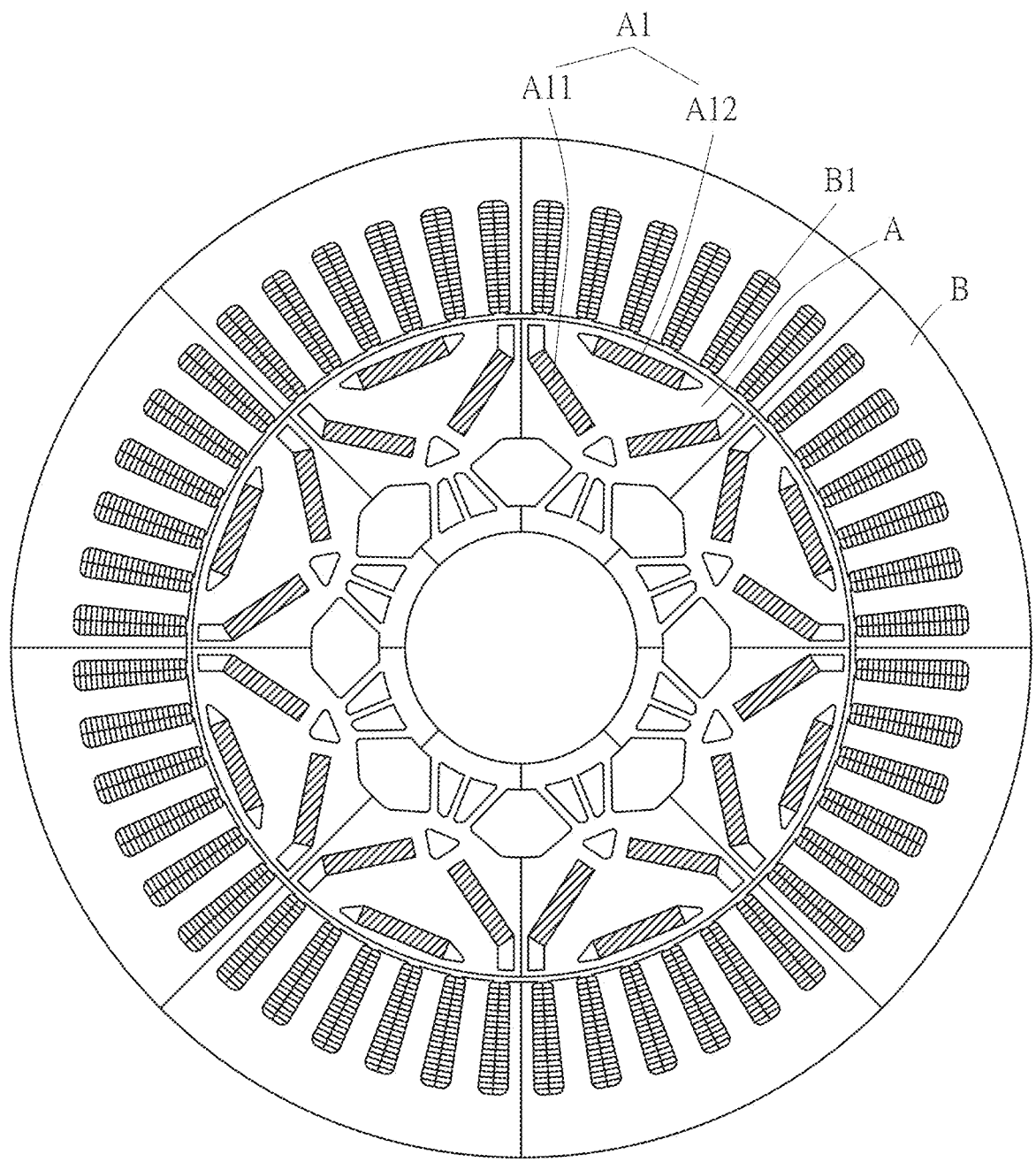
FIG. 4 is a schematic view of a conventional motor.
Figure 5A:
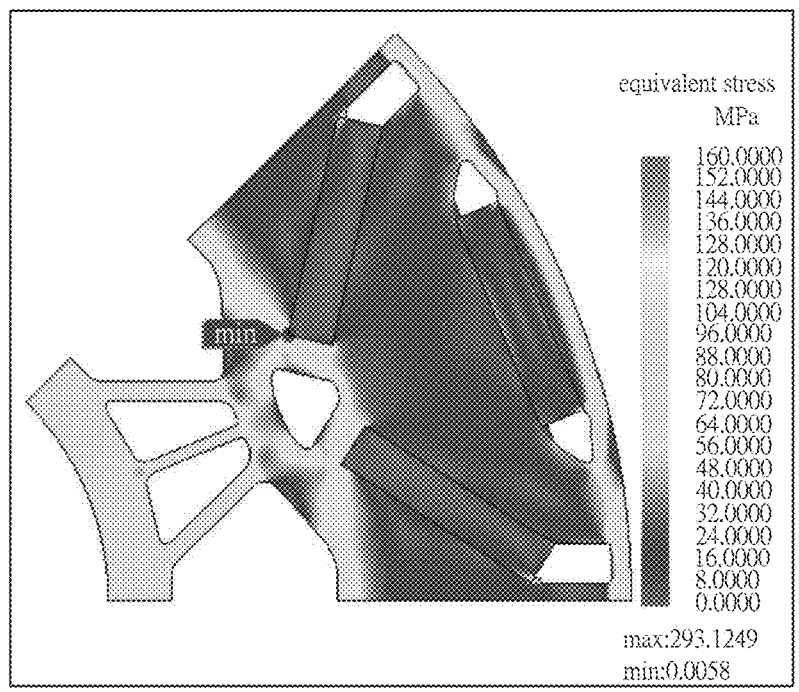
FIGS. 5A-5D are schematic views, illustrating the stress distribution of the motor of the present invention and the conventional motor under the rotational speed of 12000 rpm.
Figure 5B:
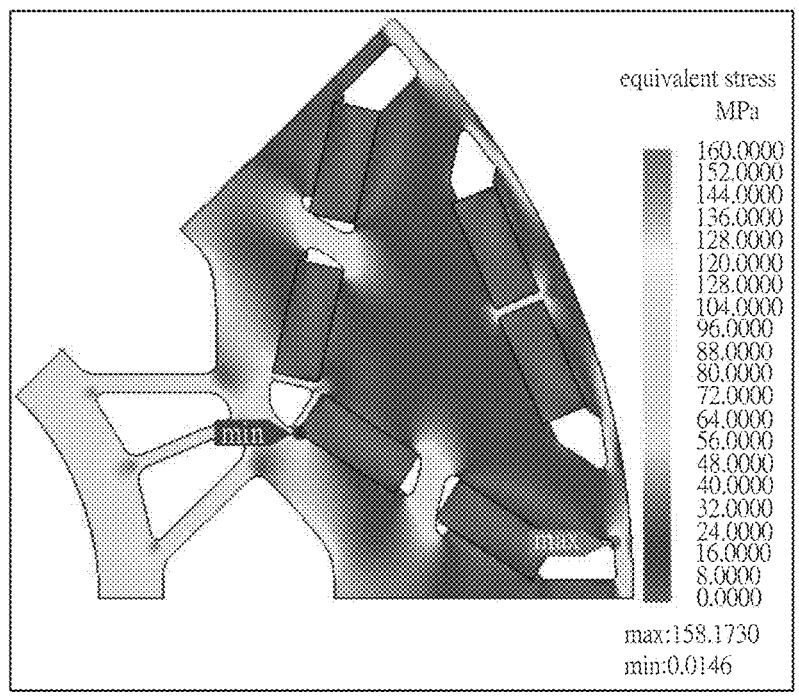
Figure 5C:
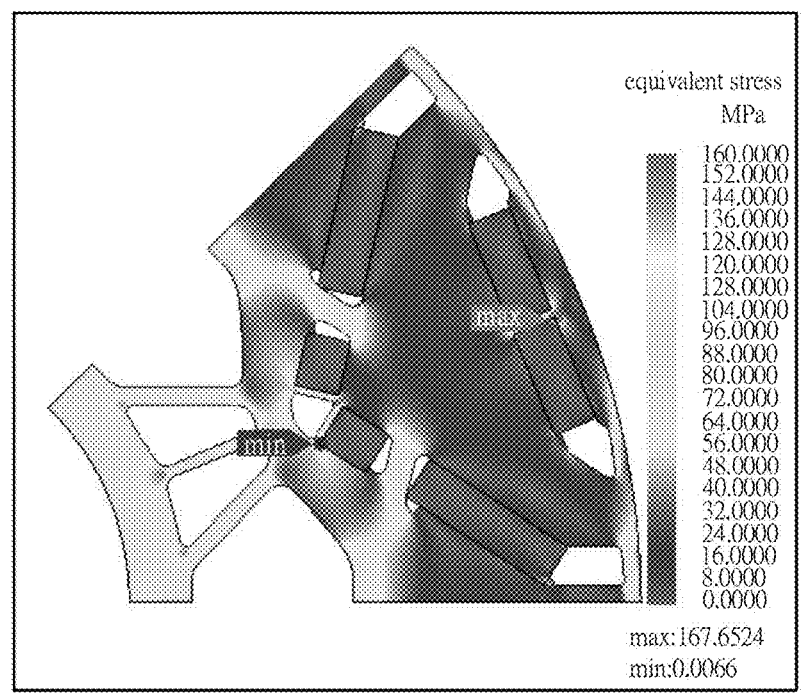
Figure 5D:
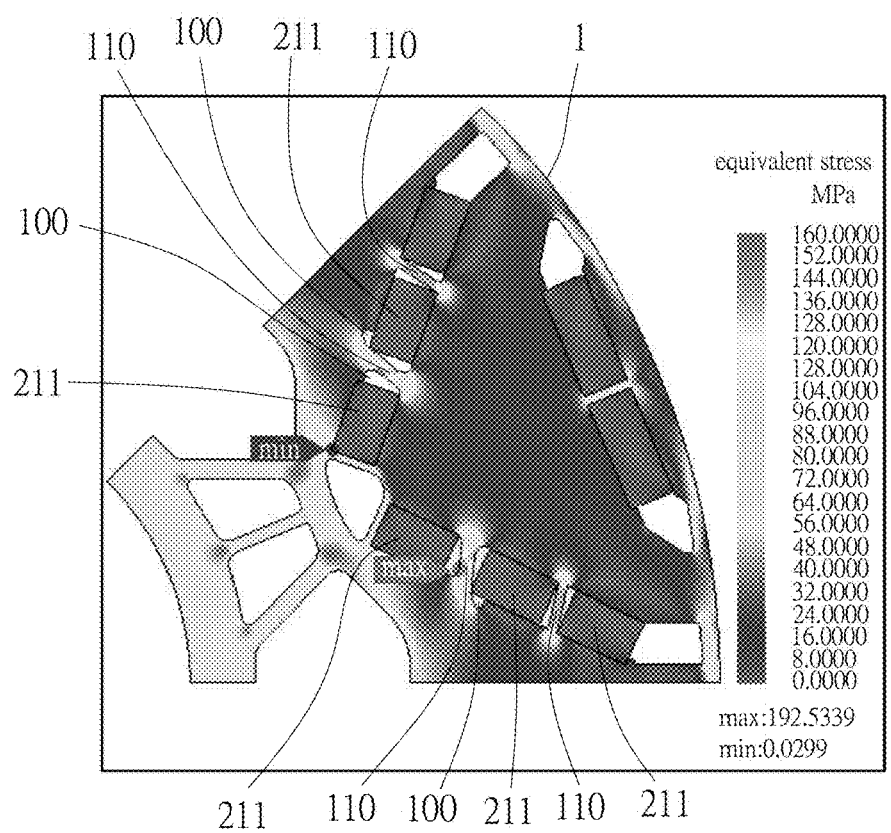

| | the motor as shown in FIG. 4 | the motor as shown in FIG. 1 | the motor as shown in FIG. 2 | the motor as shown in FIG. 3 |
|---|---|---|---|---|
| Torque@(300A/80 deg/12000 rpm) (Nm) | 51 | 51 | 52 | 49 |
| Torque@(566A/55$^{deg}$/ 4500 rpm) (Nm) | 223 | 221.8 | 222 | 221 |
| Torque@(300A/45$^{deg}$/ 5200 rpm) (Nm) | 126.7 | 125.8 | 126.1 | 125.9 |
| Max. Power (kW) | 104 | 104.5 | 104.6 | 104.14 |
| PM temperature | 120° C. | 120° C. | 120° C. | 120° C. |
| Ich@Base speed | 306.145 | 299.6 | 299 | 298 |
| Torque ripple (%) | 7.5 | 7.7 | 8.1 | 9.5 |
| BemfTHD (%) | 4.3 | 3.2 | 5 | 3.5 |

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A rotor structure for a motor, comprising:
a rotor core, the rotor core being configured with a plurality of receiving notches separated by ribs, wherein the rotor core has a plurality of magnetic member units arranged around a periphery of the rotor core, each magnetic member unit including two first magnetic members and a second magnetic member, wherein each first magnetic member of said two first magnetic members has a respective first end and a respective second end, the two first magnetic members being obliquely arranged in a V shape relative to a center of the rotor core with the respective first ends thereof disposed in a close proximity to one another, and the second magnetic member extending transversely between the respective second ends of said two first magnetic members in each of said plurality of magnetic units, wherein said each first magnetic member is configured with a plurality of permanent magnets aligned along a respective substantially straight line between said respective first and second ends of said each first magnetic member, wherein adjacent permanent magnets of said plurality of permanent magnets in said each first magnetic member are received in adjacent respective receiving notches of said plurality thereof spaced apart from one another by a respective rib along said respective substantially straight line, said respective straight lines of said two first magnetic members being arranged obliquely.

2. The rotor structure as claimed in claim 1, wherein the second magnetic member has at least two spaced apart permanent magnets aligned along a straight line arranged transversely between said respective second ends of said two first magnetic members.

3. The rotor structure as claimed in claim 1, wherein the permanent magnets of each first magnetic member are of equal length.

4. The rotor structure as claimed in claim 1, wherein the permanent magnets of each first magnetic member are of unequal length.

5. A motor, comprising:

a rotor core, the rotor core being configured with a plurality of receiving notches separated by ribs, wherein the rotor core has a plurality of magnetic member units arranged around a periphery of the rotor core, each magnetic member unit including two first magnetic members and a second magnetic member, wherein each first magnetic member of said two first magnetic members has a respective first end and a respective second end, the two first magnetic members being obliquely arranged in a V shape relative to a center of the rotor core with the respective first ends thereof disposed in a close proximity to one another, and the second magnetic member extending transversely between the respective second ends of said two first magnetic members in each of said plurality of magnetic units, wherein said each first magnetic member is configured with a plurality of permanent magnets aligned along a respective substantially straight line between said respective first and second ends of said each first magnetic member, wherein adjacent permanent magnets of said plurality of permanent magnets in said each first magnetic member are received in adjacent respective receiving notches of said plurality thereof spaced apart from one another by a respective rib along said respective substantially straight line, said respective straight lines of said two first magnetic members being arranged obliquely; and a stator core, the stator core covering the rotor core, the stator core having a plurality of stator windings arranged annularly, the stator windings corresponding to the magnetic member units.

6. The motor as claimed in claim 5, wherein the second magnetic member has at least two spaced apart permanent magnets aligned along a straight line arranged transversely between said respective second ends of said two first magnetic members.

7. The motor as claimed in claim 5, wherein the permanent magnets of each first magnetic member are of equal length.

8. The motor as claimed in claim 5, wherein the permanent magnets of each first magnetic member are of unequal length.

* * * * *